(12) United States Patent
Castro et al.

(10) Patent No.: US 7,022,352 B2
(45) Date of Patent: Apr. 4, 2006

(54) ENCAPSULATED FLAVORS AND CHEWING GUM USING SAME

(75) Inventors: Armando J. Castro, Westchester, IL (US); Sonya S. Johnson, LaGrange Highlands, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 108 days.

(21) Appl. No.: 10/624,953

(22) Filed: Jul. 21, 2003

(65) Prior Publication Data

US 2004/0022895 A1    Feb. 5, 2004

Related U.S. Application Data

(60) Provisional application No. 60/398,145, filed on Jul. 23, 2002.

(51) Int. Cl.
*A23G 3/30* (2006.01)
*A23L 2/26* (2006.01)
*A23L 2/35* (2006.01)

(52) U.S. Cl. .................. 426/3; 426/5; 426/96; 426/650; 426/651

(58) Field of Classification Search .................. 426/96, 426/650, 651, 3, 5
See application file for complete search history.

(56) References Cited

U.S. PATENT DOCUMENTS

| | | | |
|---|---|---|---|
| 2,886,446 A * | 5/1959 | Kramer et al. .................. 426/5 |
| 3,666,496 A * | 5/1972 | Homey et al. .................. 426/96 |
| 4,532,145 A | 7/1985 | Saleeb et al. |
| 4,610,890 A | 9/1986 | Miller et al. |
| 4,707,367 A | 11/1987 | Miller et al. |
| 4,820,534 A | 4/1989 | Saleeb et al. |
| 5,035,896 A | 7/1991 | Apfel et al. |
| 5,087,461 A | 2/1992 | Levine et al. |
| 5,124,162 A | 6/1992 | Bošković et al. |
| 5,158,790 A * | 10/1992 | Witkewitz et al. ............. 426/3 |
| 5,266,335 A | 11/1993 | Cherukuri et al. |
| 5,266,336 A * | 11/1993 | McGrew et al. ................. 426/4 |
| 5,273,771 A | 12/1993 | Rapaille et al. |
| 5,478,569 A | 12/1995 | Berneis et al. |
| 5,506,353 A | 4/1996 | Subramaniam |
| 5,603,952 A | 2/1997 | Soper |
| 5,603,971 A | 2/1997 | Porzio et al. |
| 5,786,017 A | 7/1998 | Blake et al. |
| 5,897,897 A | 4/1999 | Porzio et al. |
| 5,952,019 A | 9/1999 | Yatka et al. |
| 6,077,540 A | 6/2000 | Daher et al. |
| 6,150,086 A | 11/2000 | Boyle et al. |
| 6,187,351 B1 | 2/2001 | Porzio et al. |
| 6,235,274 B1 | 5/2001 | Lou et al. |
| 6,251,478 B1 | 6/2001 | Pacifico et al. |
| 6,274,162 B1 | 8/2001 | Steffenino et al. |
| 6,416,799 B1 | 7/2002 | Porzio et al. |

FOREIGN PATENT DOCUMENTS

| | | |
|---|---|---|
| EP | 0 426 428 A1 | 5/1991 |
| EP | 0 550 067 A1 | 7/1993 |
| EP | 0 528 466 B1 | 4/1995 |
| EP | 1 252 828 A | 10/2002 |
| JP | 01-186858 | 7/2001 |
| WO | WO 96/20612 | 7/1996 |
| WO | WO 01/35764 A1 | 5/2001 |

OTHER PUBLICATIONS

Material Safety Data sheet for Norland Fish Gelatin, Norland Products Incorporated, 2 pages, Apr. 5, 2001.
Specification sheet, 53000 Valspray A, Valmar, Z.I. St. Mitre, Aubagne, France, 1 page, Jul. 2001.
Product brochure for Gum Acacia, Valmar, Z.I. St. Mitre, Aubagne, France, 5 pages, undated but prior to Jul. 23, 2002.

* cited by examiner

*Primary Examiner*—Arthur L. Corbin
(74) *Attorney, Agent, or Firm*—Steven P. Shurtz; Brinks Hofer Gilson & Lione

(57) ABSTRACT

A chewing gum composition comprises about 5% to about 95% gum base, about 5% to about 96% bulking and sweetening agents, and about 0.1% to about 15% flavor, wherein at least part of the flavor is a flavor encapsulated in a matrix comprising about 30% to about 60% acacia gum, about 30% to about 60% corn syrup solids having a DE of between about 2.4 and about 44, and about 2% to about 20% gelatin, with the acacia gum and corn syrup solids together comprising at least 80% of the matrix.

37 Claims, 2 Drawing Sheets

Flavor Retention of Gum Flavored with Spray Dried Ethyl Butyrate

Flavor Retention of Gum Flavored with Mixed Flavor Blend

ENCAPSULATED FLAVORS AND CHEWING GUM USING SAME

REFERENCE TO EARLIER FILED APPLICATION

The present application claims the benefit of the filing date under 35 U.S.C. § 119(e) of Provisional U.S. Patent Application Ser. No. 60/398,145, filed Jul. 23, 2002, which is hereby incorporated by reference in its entirety.

BACKGROUND OF THE INVENTION

The present invention relates to flavored chewing gums that have improved flavor retention using flavor encapsulation, as well as methods of encapsulating flavor, the resulting encapsulated flavor and methods of making such chewing gum.

Conventional mint flavored chewing gums are made with spearmint and peppermint flavor oils, which are also called essential oils and have a very high boiling point. These mint flavors are generally retained in the chewing gum for the entire shelf life of the product. Other essential oils are fruit flavored oils such as orange oil or lemon oil, or spice oils such as clove oil and wintergreen oil (methyl salicylate). These fruit or spice flavor oils have a relatively high boiling point, thus these also are retained in the chewing gum during its normal shelf life. However, many other fruit flavors are from flavor esters, and some of these esters have very high vapor pressures, and thus very low boiling points. Consequently, the low boiling flavor esters have a tendency to evaporate from the chewing gum and thus are not retained over the normal shelf life of the product. This causes a loss of taste if only the esters are used. Also, for mixed fruit flavors, which use a combination of fruit esters and orange and lemon and spice oils, the mixed fruit flavor changes during the shelf life of the chewing gum product.

Due to the characteristics of chewing gum, much higher levels of flavor are used in chewing gum than in other types of confections. As a result, the flavor changes are more dramatic in gum products than in other types of confections, especially when some of the flavor is lost due to volatility.

Various prior art suggested methods to improve retention of volatile flavors involve encapsulation, either by spray drying with a variety of components, such as gum arabic or maltodextrins, or absorption onto various carriers, or by extrusion into a maltodextrin/polymer matrix. For example, U.S. Pat. No. 6,187,351 discloses encapsulating flavor in a carbohydrate-based glassy matrix prepared by the use of aqueous plasticizers and melt extrusion. U.S. Pat. No. 4,610,890 discloses a solid flavor composition made by melt blending sugar, starch hydroylsate and an emulsifier. Other patents which disclose methods of encapsulating or otherwise treating flavors include U.S. Pat. Nos. 6,235,274; 5,478,569; 5,897,897; 5,603,971; 5,506,353; 5,786,017; 5,087,461 and 4,532,145.

Some of these methods have not always been completely successful in retaining volatile flavors in chewing gum. While some other of the methods have been successful, they are also fairly complicated and/or expensive. Hence, there is a long felt need for a simple, fairly inexpensive method of treating volatile flavors, especially fruit esters, so that they are not lost from chewing gum as the gum undergoes its normal shelf life storage.

SUMMARY OF THE INVENTION

A method of encapsulating flavors has been developed that is simple, yet surprisingly gives the flavors good retention over the normal shelf life storage of chewing gum into which they are mixed. The invention is useful for all types of flavors, but is preferred for volatile flavors.

In a first aspect the invention is a method of encapsulating flavor comprising: providing a flavor; providing encapsulating ingredients comprising acacia gum, corn syrup solids having a DE of between about 24 and about 44, and gelatin; and encapsulating the flavor with a matrix comprising about % to about 60% acacia gum, about 30% to about 60% of said corn syrup solids and about 2% to about 10% gelatin to form an encapsulated flavor material.

In a second aspect the invention is an encapsulated flavor comprising about 5% to about 25% flavor and a matrix encapsulating the flavor, the matrix comprising about 30% to about 60% acacia gum, about 30% to about 60% corn syrup solids having a DE of between about 24 and about 44; and about 2% to about 20% gelatin, wherein the matrix comprises at least 80% acacia gum and corn syrup solids on a combined basis.

In a third aspect the invention is a method of making a chewing gum product comprising the steps of encapsulating a flavor in a matrix comprising about 30% to about 60% acacia gum, about 30% to about 60% corn syrup solids having a DE of between about 24 and about 44, and about 2% to about 20% gelatin, the matrix comprising at least 80% acacia gum and corn syrup solids on a combined basis; mixing the encapsulated flavor with gum base and one or more bulking and sweetening agents to form a chewing gum composition; and forming the chewing gum composition into a chewing gum product.

In a fourth aspect the invention is a chewing gum composition comprising about 5% to about 95% gum base, about 5% to about 96% bulking and sweetening agents, and about 0.1% to about 15% flavor, wherein at least part of the flavor comprises a flavor encapsulated in a matrix comprising about 30% to about 60% acacia gum, about 30% to about 60% corn syrup solids having a DE of between about 24 and about 44, and about 2% to about 20% gelatin, the matrix comprising at least 80% acacia gum and corn syrup solids on a combined basis.

The encapsulation of the present invention provides a simple and low cost but effective encapsulation of flavors, particularly volatile flavors. As a result, chewing gum made with the encapsulated flavor of the present invention can have a long shelf life and maintain its flavor level, or the correct blend of flavors, for commercially significant shelf life periods.

The invention and its advantages will be better understood in view of the attached drawings.

DETAILED DESCRIPTION OF THE DRAWINGS AND PREFERRED EMBODIMENTS OF THE INVENTION

Figure 1:
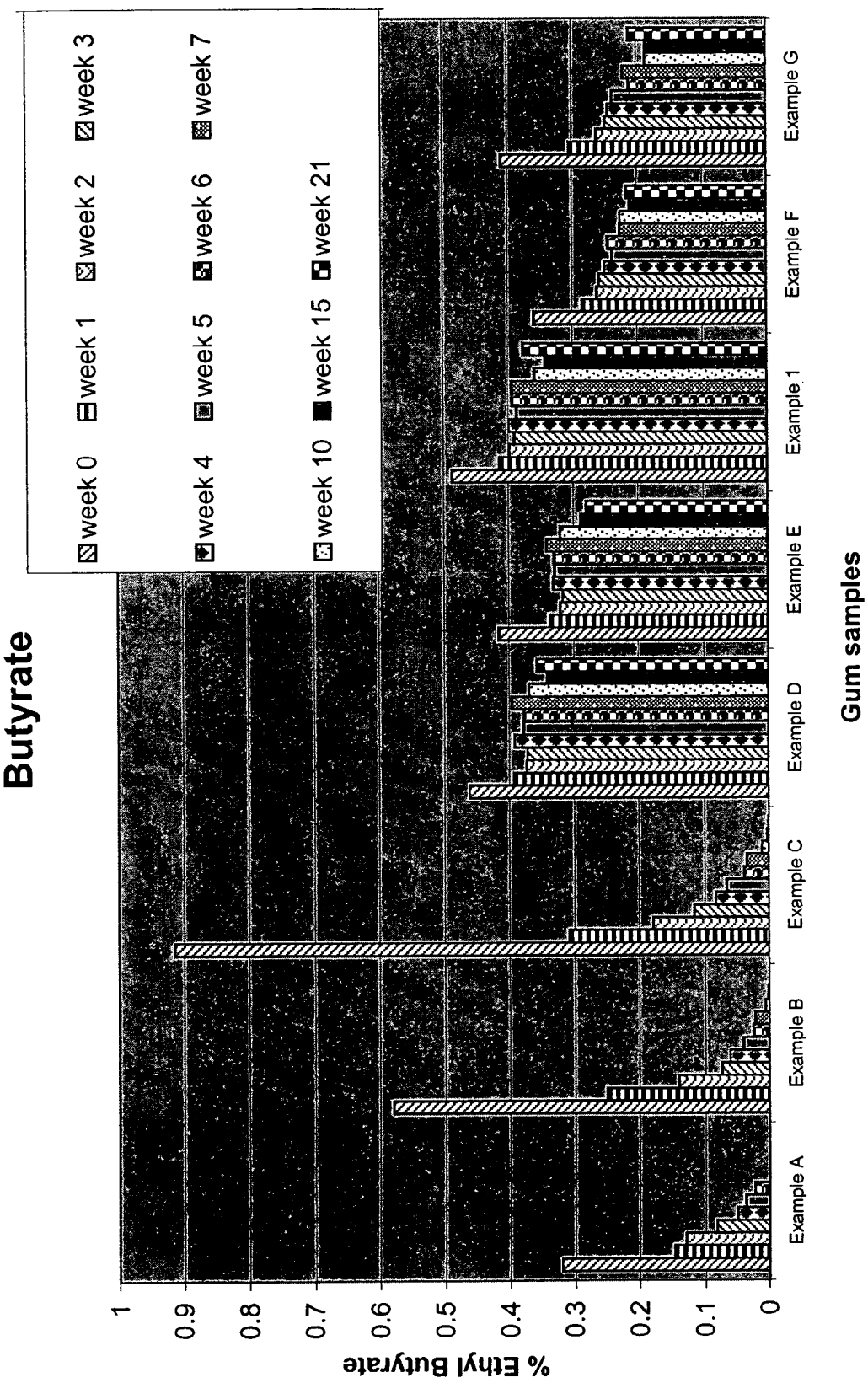
FIG. 1 is a graph showing test results of one example of the invention and some comparative examples.

In the description that follows, all percentages are weight percentages unless otherwise indicated. The term chewing gum as used herein and in the claims that follow also includes bubble gum and the like.

Some flavor components that are volatile and are lost during the shelf life of the gum product are:

|  | Boiling Point (° C.) | Flash Point (° F.) |
| --- | --- | --- |
| Ethyl butyrate | 120 | 67 |
| Isoamyl acetate | 142 | 77 |
| Ethyl propionate | 99 | 54 |
| Ethyl acetate | 77 | 26 |
| Ethyl caproate | 167 | 121 |
| Amyl acetate | 142 | 75 |
| Ethyl isobutyrate | 112 | 57 |
| Propyl acetate | 102 | 67 |
| Isobutyl acetate | 115 | 71 |

Some non-volatile flavor components often used in chewing gum are:

|  | Boiling Point (° C.) | Flash Point (° F.) |
| --- | --- | --- |
| Lemon oil | 176 | 130 |
| Orange oil | 175 | 130 |
| Clove oil | 251 | 230 |
| Peppermint oil | 210 | 170 |
| Spearmint oil | 200 | 200 |
| Cinnamaldehyde | 240 | 160 |
| Methyl salicylate | 222 | >230 |

Flavors that are volatile are also relatively low boiling point compounds compared to other non-volatile flavors, as can be seen from the boiling point information above. Volatile flavor components generally have a boiling point below about 160° C. These materials also have a very low flash point, that could cause them to be flammable. Generally, the flash point for the volatile flavor components is less than about 120° F. Since many of the non-volatile flavor components may also contain some low boiling point components in them, the inventive spray drying matrix may also be used to give a more stable spray dried matrix retaining the entire flavor. Preferably, the inventive matrix should be used to improve the retention of the more volatile flavors and make a more shelf stable flavor blend.

In this invention, a specific matrix of acacia gum, such as gum arabic; corn syrup solids having a DE of about 24 to about 44; and gelatin, gives an improved encapsulated product containing the flavor. Preferably, the matrix should have a ratio of 10 parts gum arabic, 10 parts corn syrup solids having a DE of about 24–44, and 1 part gelatin. In order to avoid some regulatory issues in some foreign countries, the most appropriate gelatin to use is fish gelatin. This unique matrix has been shown to give good retention of volatile flavors in chewing gum.

The matrix containing these three components should be within the range of about 30–60% acacia gum, about 30–60% corn syrup solids having a DE of about 24–44, and about 2–20% gelatin, with the combination of acacia gum and corn syrup solids being at least 80% of the matrix. Preferably, the range should be about 40–50% acacia gum, about 40–50% corn syrup solids having a DE of about 24–44, and about 2–10% gelatin. The ratio of acacia gum to corn syrup solids is preferably between about 2:1 and about 1:2, and the ratio of gelatin to the total of acacia gum and corn syrup solids is between about 5:1 and about 40:1. Most preferably the ratio of acacia gum:corn syrup solids:gelatin is about 1:1:0.1.

The finished encapsulated flavor composition should be about 5–25% flavor, about 24–48% acacia gum, about 24–48% corn syrup solids having a DE of about 24–44, and about 2–16% gelatin. Preferably the final encapsulated flavor composition should be about 15–20% flavor, about 30–40% acacia gum, about 30–40% corn syrup solids having a DE of about 24–44, and about 2–8% gelatin. The ratio of the flavor to the matrix is preferably between about 1:4 and about 1:20.

The preferred acacia gum is gum arabic, which comes from *Acacia senegal*. A preferred gum arabic is VALSPRAY A 53000, a spray dried gum arabic supplied by VALMAR, Z. I. St. Mitre, 13400 Aubagne, France. The moisture in this material is less than 10%. Gum arabic from *Acacia seyal* (sometimes referred to as gum talha) may also be used. The low moisture content of commercially supplied acacia gum, as well as other ingredients used to make the matrix, is ignored in the present description and claims. Thus, the amounts of acacia gum used in the examples is recited as if commercially supplied acacia gum was 100% acacia gum and had no moisture.

The preferred corn syrup solids have a DE of between about 24 and about 44. Preferably the corn syrup solids have a DE of between about 30 and about 44. More preferably the corn syrup solids have a DE of between about 36 and about 44. In the present most preferred embodiment of the invention, the corn syrup solids have a DE of about 44. A suitable corn syrup solids is STAR-DRI 42 from A.E. Staley Manufacturing Co., 2200 E. Eldorado St., Decatur, Ill.

The preferred gelatin is fish gelatin, such as high molecular weight, kosher, dried fish gelatin from Norland Products Incorporated, Building 100, 2540 Route 130, Cranbury, N.J. 08512. This gelatin is preferred because it does not contain protein from beef or pork sources, and therefore has less regulatory constraints. However, it is believed that other comparable gelatins will also work in the present invention. The amount of gelatin needed will depend on the gelatin used, as will be understood by one of ordinary skill in the art.

The volatile flavors that are particularly useful when encapsulated according to the present invention, include ethyl butyrate, isoamyl acetate, ethyl propionate, ethyl acetate, ethyl caproate, amyl acetate, ethyl isobutyrate, propyl acetate, isobutyl acetate and mixtures thereof, and mixtures of the above with other flavors such as orange oil, lemon oil, clover oil, peppermint oil, spearmint oil, cinnamaldehyde, methyl salicylate and mixtures thereof.

Spray drying is the most common and economical method of encapsulating the flavors, although other encapsulation techniques may be used. The mixture used for the spray drying will generally comprise about 0% to about 60% water, about 32% to about 10% encapsulating ingredients and about 5% to about 12% flavor prior to being spray dried. To prepare flavors for spray drying, the carrier or wall material (the acacia gum, corn syrup solids and gelatin) is hydrated to give a 40–50% solution. For the comparative and inventive examples described hereafter, a 50% solution of acacia gum was hydrated overnight. The corn syrup solids and gelatin were hydrated for a few minutes to give a 50% solution just before mixing with the acacia gum solution and the flavor. The flavor was added to the mix of acacia gum and the other ingredients and homogenized. The ratio of solids to flavor material was about 4:1. The mixture was homogenized to create small droplets of flavor within the carrier solution. It is believed that the creation of a finer emulsion increases the retention of flavor during the spray drying process. The flavor/carrier mixture was fed into a Niro Atomizer Spray Dryer, where it was atomized through a spinning wheel. Hot air flowing in co-current direction contacted the atomized particles and evaporated the water. This produced dried particles having the matrix containing small droplets of flavor. The dried particles fell to the bottom of the dryer and were collected. The inlet temperature for spray drying was between 180–205° C. and the outlet temperature was between 80–105° C., Preferably the spray drying inlet temperature will be between about 190° C. and about 200° C.

The encapsulated flavor of the present invention can be utilized in a wide variety of chewing gum compositions, including sugar gums and sugarless gums, formed into a wide variety of products, including gum sticks as well as pellets or balls.

In general, a chewing gum composition typically comprises a water-soluble bulk portion, a water-insoluble chewable grams base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, softeners and inorganic fillers. The gum base may or may not include wax. The insoluble gum base can constitute approximately 5% to about 95% by weight of the chewing gum, more commonly the gum base comprises 10% to about 50% of the gum, and in some preferred embodiments approximately 25% to about 35% by weight, of the chewing gum.

In a particular embodiment, the chewing gum base of the present invention contains about 20% to about 60% by weight synthetic elastomer, about 0% to about 30% by weight natural elastomer, about 5% to about 55% by weight elastomer plasticizer, about 4% to about 35% by weight filler, about 5% to about 35% by weight softener, and optional minor amounts (about 1 or less by weight) of miscellaneous ingredients such as colorants, antioxidants, etc.

Synthetic elastomers may include, but are not limited to, polyisobutylene with GPC weight average molecular weight of about 10,000 to about 95,000, isobutylene-isoprene copolymer (butyl elastomer), styrene-butadiene, copolymers having styrene-butadiene ratios of about 1:3 to about 3:, polyvinyl acetate having GPC weight average molecular weight of about 2,000 to about 90,000, polyisoprene, polyethylene, vinyl acetate—vinyl laurate copolymer having vinyl laurate content of about 5% to about 50% by weight of the copolymer, and combinations thereof.

Preferred ranges for polyisobutylene are 50,000 to 80,000 GPC weight average molecular weight and for styrene-butadiene are 1:1 to 1:3 bound styrene-butadiene, for polyvinyl acetate are 10,000 to 65,000 GBC weight average molecular weight with the higher molecular weight polyvinyl acetates typically used in bubble gum base, and for vinyl acetate-vinyl laurate, vinyl laurate content of 10–45%.

Natural elastomers may include natural rubber such as smoked or liquid latex and guayule as well as natural gurus such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters such as glycerol esters or partially hydrogenated rosin, glycerol esters of polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer that is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof. Softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water-soluble bulk portion and one or more flavoring agents. The water-soluble portion can include bulk sweeteners and or other bulking and sweetening agents, including high-intensity sweeteners; flavoring agents, softeners, emulsifiers, colors, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5% to about 15% by weight of the chewing gum, The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk and sweetening agents typically constitute about 5% to about 95% by weight of the chewing gum, more typically, about 20% to about 80% by weight, and more commonly, about 30% to about 60% by weight of the gum. Sugar sweeteners generally include saccharide-containing components commonly known in the chewing gum art, including but not limited to, sucrose, dextrose, maltose, dextrin, dried invert sugar, fructose, levulose, galactose, corn syrup solids, and the like, alone or in combination.

Sugarless sweeteners include, but are not limited to, sugar alcohols such as sorbitol, mannitol, xylitol, hydrogenated starch hydrolysates, maltitol, and the like, alone or in combination.

High-intensity artificial sweeteners can also be used, alone or in combination, with the above. Preferred sweeteners include, but are not limited to, sucralose, aspartame, N-substituted APM derivatives such as neotame, salts of acesulfame, alitame, saccharin and its salts, cyclamic acid and its salts, glycyrrhizinate, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Examples of low caloric bulking agents include: polydextrose; Raftilose, Raftilin; fructooligosaccharides (NutraFlora); palatinose oligosaccharide; guar gum hydrolysate (Sun Fiber); or indigestible dextrin (Fibersol). However, other low calorie bulking agents can be used.

In addition to the encapsulated flavors discussed above, a variety of additional flavoring agents can also be used, if desired. The flavor can be used in amounts of about 0.1 to about 15 weight percent of the gum, and preferably, about 0.2% to about 5% by weight. The amount of flavor in the encapsulated flavor will preferably comprise about 0.1 to about 10 percent of the chewing gum composition. The additional flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

In general, chewing gum is manufactured by sequentially adding the various chewing gum ingredients to a commercially available mixer known in the art. After the ingredients have been thoroughly mixed, the gum mass is discharged from the mixer and shaped into the desired form such as rolling sheets and cutting into sticks, extruding into chunks or casting into pellets, which are then coated or panned.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further parts of the bulking agent are added to the mixer. Flavoring agents are typically added with the final portion of the bulking agent. Other optional ingredients are added to the batch in a typical fashion, well known to those of ordinary skill in the art.

The entire mixing procedure typically takes from five to fifteen minutes, but longer mixing times may sometimes be required. Those skilled in the art will recognize that many variations of the above-described procedure may be followed.

EXAMPLES

One of the most common fruit esters is ethyl butyrate (pineapple flavor). This material is used in a variety of fruit flavor blends for chewing gum. Because it is very volatile, it will dissipate from the chewing gum formula, which will modify the overall fruit flavor of the final product. By spray drying the ethyl butyrate, the flavor will be retained in the chewing gum matrix for a longer period of time. However, the spray drying encapsulant is very important since the flavor must be held in the encapsulating matrix as long as possible. Many standard encapsulants are not sufficiently effective to retain volatile flavors such as ethyl butyrate. As a result, tests were done to determine the extent of loss of ethyl butyrate in various encapsulants. A chewing gum composition was prepared according to the following formula:

|  | % |
|---|---|
| Sugar | 58.23 |
| Gum Base | 19.30 |
| 45.5 Be Corn Syrup | 13.91 |
| Dextrose Monohydrate | 7.28 |
| Glycerin | 1.15 |
| Lecithin | 0.13 |
| Total | 100.0 |

The encapsulated ethyl butyrate materials were added to the chewing gum and stored unwrapped at room temperature for up to 20 weeks. At different weekly intervals, samples were taken and analyzed for ethyl butyrate. The level of retained ethyl butyrate was recorded in Table 1 below, and the results graphed in FIG. 1

Comparative Examples A, B, and C

To the above gum formula was added 0.5%, 1.0%, and 2.0% liquid ethyl butyrate, reducing the sugar level by an equal amount to make Examples A, B, and C, respectively Comparative Example D To the above gum formula was added 5.9% of a spray dried ethyl butyrate made with 77% acacia gum and 4% fish gelatin, giving a spray dried material with an active ethyl butyrate of 8.57% and a level of 0.5% in the gum.

Comparative Example E

To the above gum formula was added 10.0% of a spray dried ethyl butyrate made with 38% acacia gum, 38% maltodextrin with a DE of 1, and 4% fish gelatin, giving a spray dried material with an active ethyl butyrate of 5% and an active level of 0.5% in the gum.

Comparative Example F

To the above gum formula was added 8.9% of a spray dried ethyl butyrate made with 79% acacia gum and 1% fish gelatin, giving a spray dried material with an active ethyl butyrate of 5.66% and an active level of 0.5% in the gum.

Comparative Example G

To the above gum formula was added 4.05% of a spray dried ethyl butyrate made with 60% corn syrup solids with a DE of 44, and 20% fish gelatin, giving a spray dried material with an active ethyl butyrate of 12.27% and an active level of 0.5% in the gum.

Inventive Example 1

To the above gum formula was added 5.55% of a spray dried ethyl butyrate made with 38% acacia gum, 38% corn syrup solids with a DE of 44, and 4% fish gelatin, giving a spray dried material with an active ethyl butyrate of 11.03% and an active level of 0.5% in the gum.

The amount of ethyl butyrate in each of the gum samples was analyzed at intervals from zero to 21 weeks. The percentage of ethyl butyrate in the gum is presented in Table 1 below.

TABLE 1

|  | Comp. Example A | Comp. Example B | Comp. Example C | Comp. Example D | Comp. Example E | Example 1 | Comp. Example F | Comp. Example G |
|---|---|---|---|---|---|---|---|---|
| Week 0 | 0.32 | 0.580 | 0.914 | 0.461 | 0.415 | 0.487 | 0.359 | 0.410 |
| Week 1 | 0.148 | 0.250 | 0.308 | 0.393 | 0.337 | 0.414 | 0.285 | 0.304 |
| Week 2 | 0.130 | 0.140 | 0.179 | 0.374 | 0.321 | 0.398 | 0.261 | 0.262 |
| Week 3 | 0.82 | 0.074 | 0.116 | 0.373 | 0.316 | 0.390 | 0.258 | 0.248 |
| Week 4 | 0.05 | 0.061 | 0.082 | 0.392 | 0.331 | 0.399 | 0.240 | 0.244 |
| Week 5 | 0.038 | 0.041 | 0.066 | 0.378 | 0.330 | 0.387 | 0.238 | 0.237 |
| Week 6 | 0.024 | 0.026 | 0.039 | 0.378 | 0.331 | 0.394 | 0.245 | 0.212 |
| Week 7 |  | 0.023 | 0.035 | 0.396 | 0.342 | 0.394 | 0.226 | 0.220 |
| Week 10 |  | 0.006 | 0.011 | 0.370 | 0.321 | 0.359 | 0.225 | 0.186 |
| Week 15 |  | 0.001 | 0.003 | 0.341 | 0.289 | 0.343 | 0.211 | 0.186 |
| Week 21 |  |  | 0.001 | 0.357 | 0.28 | 0.377 | 0.215 | 0.212 |

As can be seen from the data in Table 1 and in FIG. 1, about 40% of liquid ethyl butyrate in Comparative Examples A, B and C was lost during processing, and over the next 10 weeks almost all of the remainder of the flavor was lost. Also depicted graphically in FIG. 1, there is a slight loss of ethyl butyrate over 21 weeks for example D and considerable loss of ethyl butyrate from examples E, F, and G, but less of a loss of flavor ester in the Inventive Example 1.

In another set of examples, a mixed fruit flavor blend was made with two volatile flavor esters, ethyl butyrate and isoamyl acetate. These were blended with orange oil and lemon oil in the following proportions:

|  | % |
|---|---|
| ethyl butyrate | 50 |
| isoamyl acetate | 25 |
| orange oil | 15 |
| lemon oil | 10 |
|  | 100 |

This flavor was spray dried with three different encapsulating compositions. One was with 100% acacia gum, the second with a 50:50 blend of acacia gum and 44 DE corn syrup solids, and the third with the preferred embodiment inventive composition of 1:1:0.1125 of acacia gum:44 DE corn syrup solids:fish gelatin. The encapsulating compositions were dissolved in water at 44.4% solids, then the mixed fruit flavor was dispersed in the water at a 10% level, giving a mixture of 50% water, 40% encapsulants, and 10% flavor.

Each of the three compositions were spray dried at two different inlet temperatures (190° C. or 200° C.) to determine which temperature would give increased loading of the flavor into the encapsulant. Based on the results, more loading could be achieved with an inlet temperature of 190° C. Each of the six examples was used to make chewing gum in the formula shown above.

Comparative Example H

To the above gum formula was added 0.81% mixed fruit flavor with a corresponding decrease in the amount of sugar.

Comparative Example J

To the above gum formula was added 4.8% of the spray dried flavor made with 100% acacia gum at 190° C., giving a spray dried material with an active fruit flavor level of 16.95% and an active level of 0.81% in the gum.

Comparative Example K

To the above gum formula was added 7.2% of the spray dried flavor made with 100% acacia gum at 200° C., giving a spray dried material with an active fruit flavor level of 11.3% and an active level of 0.81% in the gum.

Comparative Example L

To the above gum formula was added 6.8% of the spray dried flavor made with 50% acacia gum and 50% 44 DE corn syrup solids at 190° C., giving a spray dried material with an active fruit flavor level of 11.95% and an active level of 0.81% in the gum.

Comparative example M

To the above gum formula was added 6.2% of the spray dried flavor made with 50% acacia gum and 50% 44 DE corn syrup solids at 200° C., giving a spray dried material with an active fruit flavor level of 13.11% and an active level of 0.81% in the gum.

Inventive Example 2

To the above gum formula was added 4.9% of the spray dried flavor made with 38% acacia gum, 38% 44 DE corn syrup solids, and 4% fish gelatin at 190° C., giving a spray dried material with an active fruit flavor level of 16.52% and an active level of 0.81% in the gum.

Inventive Example 3

To the above gum formula was added 5.1% of the spray dried flavor made with 38% acacia gum, 38% 44 DE corn syrup solids, and 4% fish gelatin at 200° C., giving a spray dried material with an active fruit flavor level of 15.82% and an active level of 0.81% to in the gum.

TABLE 2

|  | Comparative Example H | Comparative Example J | Comparative Example K | Comparative Example L | Comparative Example M | Example H | Example H |
|---|---|---|---|---|---|---|---|
| Week 0 | 0.515 | 0.790 | 1.113[1] | 0.751 | 0.800 | 0.640 | 0.694 |
| Week 3 | 0.125 | 0.654 | 0.878 | 0.603 | 0.648 | 0.648 | 0.619 |
| Week 5 | 0.030 | 0.645 | 0.878 | 0.617 | 0.666 | 0.645 | 0.569 |
| Week 7 | 0.035 | 0.643 | 0.885 | 0.572 | 0.664 | 0.630 | 0.552 |
| Week 10 | 0.024 | 0.586 | 0.793 | 0.482 | 0.663 | 0.632 | 0.556 |
| Weak 20 | 0.004 | 0.636 | 0.348 | 0.591 | 0.618 | 0.554 | 0.547 |

[1]The Week 0 amount of 1.113% flavor is higher than the amount of flavor that was supposedly added to the gum. While this result could be simply an error due to random analytical error, it is more likely that either more than 7.2% of the weight of the gum of the spray dried flavor was added (formulation error), or that the spray dried flavor actually contained more than 11.3% active flavor (analytical error). In either event,it is still clear from the data, and especially FIG. 2, that what flavor there was in Comparative Example K at Week 0 was seriously lost by the time the Week 20 measurement was made.

Figure 2:
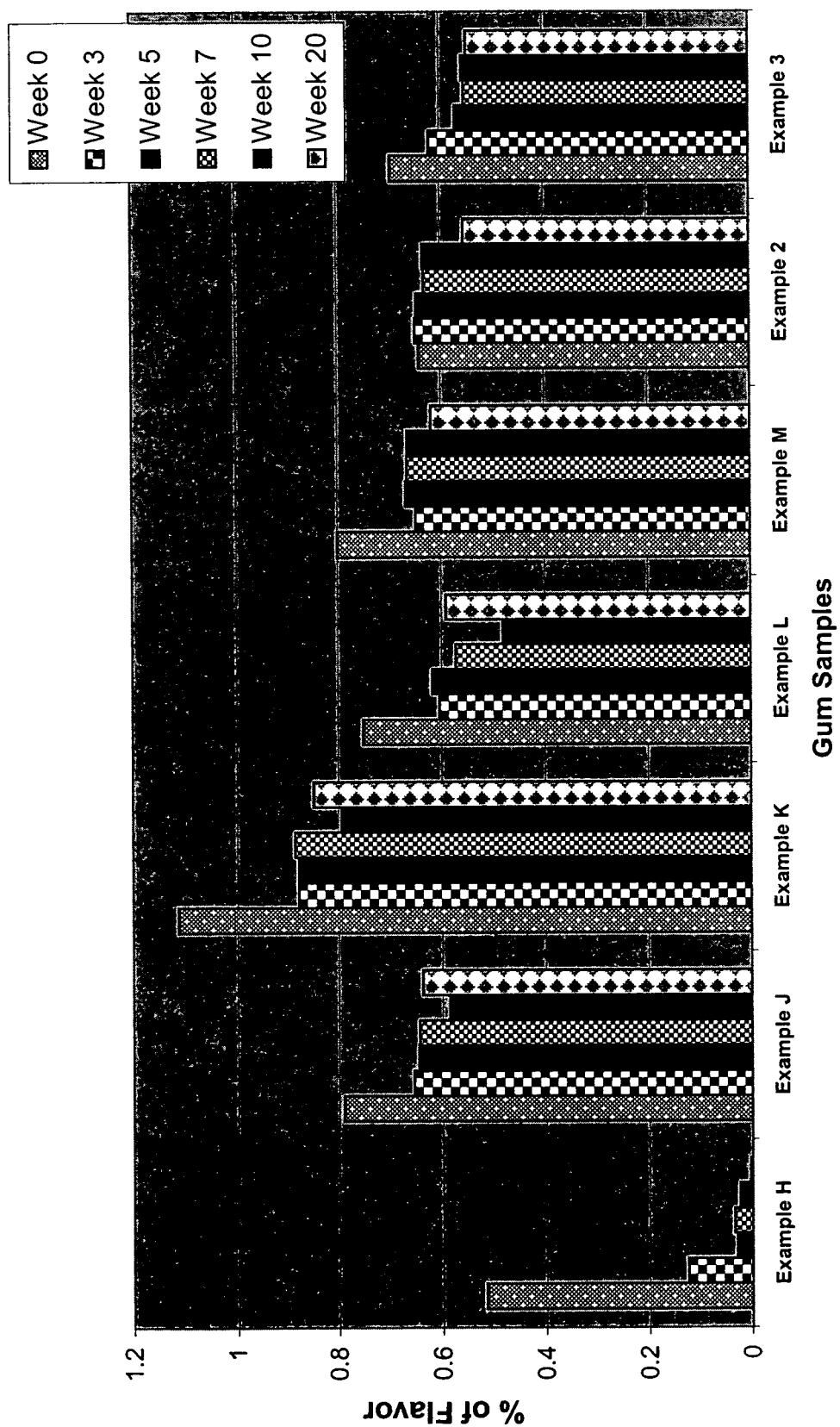
FIG. 2 is another graph, showing test results of a second and third example of the invention and some comparative examples.

Stability test results of the spray dried materials in gum are shown in Table 2, and depicted in FIG. 2. The percentage amount of fruit flavor in the gum at various time intervals is recorded below.

The difference in inlet temperature of 190° C. vs. 200° C. showed that acacia gum gave higher loading levels at 190° C. but slightly less shelf life. The mixture of acacia gum arid corn syrup solids gave the same loading levels, but better shelf life at 200° C. The inventive composition gave both higher loading and improved shelf life, but better shelf life was obtained for the Inventive Example 2 spray dried at 190° C.

The Week 0 amount of 1.113% flavor is higher than the amount of flavor that was supposedly added to the gum. While this result could be simply an error due to random analytical error, it is more likely that either more than 7.2% of the weight of the gum of the spray dried flavor was added (formulation error), or that the spray dried flavor actually contained more than 11.3% active flavor (analytical error). In either event, it is still clear from the data, and especially FIG. 2, that what flavor there was in Comparative Example K at Week 0 was seriously lost by the time the Week 20 measurement was made.

Other experiments have demonstrated that the spray dried matrix of the preferred embodiment of the invention gives better stability results compared to other conventional encapsulation processes, and gives stability results as good as more complicated and expensive encapsulation processes.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes that come within the meaning and range of equivalency of the claims are to be embraced within their scope.

What is claimed is:

1. A method of encapsulating flavor comprising:
    a) providing a flavor;
    b) providing encapsulating ingredients comprising acacia gum, corn syrup solids having a DE of between about 24 and about 44, and gelatin; and
    c) encapsulating the flavor with a matrix comprising about 30% to about 60% acacia gum, about 30% to about 60% of said corn syrup solids and about 2% to about 20% gelatin to form an encapsulated flavor material.

2. The method of claim 1 wherein the flavor comprises about 5% to about 25% of the total encapsulated flavor material.

3. The method of claim 1 wherein the acacia gum comprises gum arabic.

4. The method of claim 1 wherein the acacia gum is a spray dried acacia gum derived from *Acacia senegal.*

5. The method of claim 1 wherein the gelatin comprises fish gelatin.

6. The method of claim 1 wherein the encapsulated flavor material comprises about 15% to about 20% flavor, about 30% to about 40% gum arabic, about 30% to about 40% of said corn syrup solids and about 2% to about 8% gelatin.

7. The method of claim 1 wherein the matrix is formed by a spray drying process.

8. The method of claim 7 wherein the encapsulating ingredients and flavor are dispersed in water and the mixture of water, encapsulating ingredients and flavor are fed into a spray dryer.

9. The method of claim 8 wherein the mixture of water, encapsulation ingredients and flavor are spray dried at an inlet temperature of between about 180° C. and about 205° C.

10. The method of claim 9 wherein the inlet temperature is between about 190° C. and about 200° C.

11. The method of claim 8 wherein the mixture comprises about 50% to about 60% water, about 32% to about 40% encapsulating ingredients and about 5% to about 12% flavor prior to being spray dried.

12. The method of claim 1 wherein the flavor comprises one or more flavor components.

13. The method of claim 12 wherein the one or more flavor components comprises a blend of volatile and non-volatile flavor components.

14. The method of claim 12 wherein the flavor comprises one or more fruit esters.

15. The method of claim 1 wherein the boiling point of the flavor is less than about 160° C.

16. An encapsulated flavor material comprising:
a) about 5% to about 25% flavor;
b) a matrix encapsulating the flavor, the matrix comprising
 i) about 30% to about 60% acacia gum,
 ii) about 30% to about 60% corn syrup solids having a DE of between about 24 and about 44, and
 iii) about 2% to about 20% gelatin;
c) wherein the matrix comprises at least 80% acacia gum and corn syrup solids on a combined basis.

17. The encapsulated flavor material of claim 16 wherein the matrix comprises about 40% to about 50% acacia gum.

18. The encapsulated flavor material of claim 16 wherein the matrix comprises about 40% to about 50% of said corn syrup solids.

19. The encapsulated flavor material of claim 16 wherein the matrix comprises about 2% to about 10% gelatin.

20. The encapsulated flavor material of claim 16 wherein the encapsulated material comprises about 5% to about 25% flavor, about 24% to about 48% acacia gum, about 24% to about 48% of said corn syrup solids and about 2% to about 10% gelatin.

21. The encapsulated flavor material of claim 16 wherein the encapsulated material comprises about 15% to about 20% flavor, about 30% to about 40% acacia gum, about 30% to about 40% of said corn syrup solids and about 2% to about 8% gelatin.

22. The encapsulated flavor material of claim 16 wherein the matrix is formed by a spray drying process.

23. The encapsulated flavor material of claim 16 wherein the flavor comprises one or more of the components selected from the group consisting of ethyl butyrate, isoamyl acetate, ethyl propionate, ethyl acetate, ethyl caproate, and amyl acetate.

24. The encapsulated flavor material of claim 16 wherein the acacia gum comprises gum arabic.

25. The encapsulated flavor material of claim 16 wherein the gelatin comprises fish gelatin.

26. A method of making a chewing gum product comprising the steps of:
a) encapsulating a flavor in a matrix comprising
 i) about 30% to about 60% acacia gum,
 ii) about 30% to about 60% corn syrup solids having a DE of between about 24 and about 44, and
 iii) about 2% to about 20% gelatin,
the matrix comprising at least 80% acacia gum and corn syrup solids on a combined basis;
b) mixing the encapsulated flavor with gum base and one or more bulking and sweetening agents to form a chewing gum composition; and
c) forming the chewing gum composition into a chewing gum product.

27. The method of claim 26 wherein the composition is formed into chewing gum sticks.

28. The method of claim 27 wherein the flavor comprises one or more flavor components having a boiling point below about 160° C. and a flash point below about 120° F.

29. The method of claim 26 wherein the corn syrup solids have a DE of between about 30 and about 44.

30. The method of claim 26 wherein the corn syrup solids have a DE of between about 36 and about 44.

31. The method of claim 26 wherein the matrix is formed by spray drying.

32. A chewing gum composition comprising:
a) about 5% to about 95% gum base,
b) about 5% to about 95% bulking and sweetening agents, and
c) about 0.1% to about 15% flavor, wherein at least part of the flavor comprises a flavor encapsulated in a matrix comprising
 i) about 30% to about 60% acacia gum,
 ii) about 30% to about 60% corn syrup solids having a DE of between about 24 and about 44, and
 iii) about 2% to about 20% gelatin,
the matrix comprising at least 80% acacia gum and corn syrup solids on a combined basis.

33. The chewing gum composition of claim 32 wherein the flavor in the encapsulated flavor comprises about 0.1% to about 10% of the chewing gum composition.

34. The chewing gum composition of claim 32 wherein the acacia gum comprises gum arabic and the corn syrup solids have a DE of about 44.

35. The chewing gum composition of claim 32 wherein the ratio of acacia gum to corn syrup solids is between about 2:1 and about 1:2, and the ratio of gelatin to the total of acacia gum and corn syrup solids is between about 5:1 and about 40:1.

36. The chewing gum composition of claim 32 wherein the matrix has a ratio of acacia gum:corn syrup solids:gelatin of about 1:1:0.1.

37. The chewing gum composition of claim 32 wherein the ratio of flavor:matrix is between about 1:4 and about 1:20.

* * * * *